United States Patent
Carey et al.

(10) Patent No.: US 9,551,631 B2
(45) Date of Patent: Jan. 24, 2017

(54) SYSTEM AND METHOD FOR ADAPTING TO A VARIABLE FUEL DELIVERY CUTOUT DELAY IN A FUEL SYSTEM OF AN INTERNAL COMBUSTION ENGINE

(71) Applicant: CUMMINS INC., Columbus, IN (US)

(72) Inventors: David M. Carey, Greenwood, IN (US); Donald J. Benson, Columbus, IN (US); Sanjay Manglam, Franklin, IN (US); Paul V. Moonjelly, Columbus, IN (US); Richard E. Reisinger, Columbus, IN (US)

(73) Assignee: Cummins Inc., Columbus, IN (US)

( * ) Notice: Subject to any disclaimer, the term of this patent is extended or adjusted under 35 U.S.C. 154(b) by 359 days.

(21) Appl. No.: 13/763,507

(22) Filed: Feb. 8, 2013

(65) Prior Publication Data

US 2014/0224218 A1 Aug. 14, 2014

(51) Int. Cl.
*F02D 41/38* (2006.01)
*G01M 15/09* (2006.01)
*F02D 41/24* (2006.01)

(52) U.S. Cl.
CPC .......... *G01M 15/09* (2013.01); *F02D 41/2441* (2013.01); *F02D 41/3845* (2013.01); *F02D 41/2467* (2013.01); *F02D 2200/0602* (2013.01); *F02D 2200/0616* (2013.01)

(58) Field of Classification Search
CPC .............. F02D 41/3845; F02D 41/3863; F02D 41/3836; F02D 41/2438; F02D 41/247; F02M 63/025; F02M 47/02; F02M 65/00; G01M 15/09

USPC ................... 123/446, 447, 497, 458
See application file for complete search history.

(56) References Cited

U.S. PATENT DOCUMENTS

| | | | |
|---|---|---|---|
| 4,884,545 A * | 12/1989 | Mathis | 123/447 |
| 4,903,669 A | 2/1990 | Groff et al. | |
| 6,561,164 B1 | 2/1991 | Cavanagh | |
| 5,201,296 A | 4/1993 | Wunning et al. | |
| 5,261,366 A * | 11/1993 | Regueiro | 123/299 |
| 5,445,019 A * | 8/1995 | Glidewell et al. | 73/114.51 |
| 5,535,621 A | 7/1996 | Glidewell et al. | |
| 5,806,490 A | 9/1998 | Nogi et al. | |
| 6,088,647 A | 7/2000 | Hemberger et al. | |
| 6,105,554 A | 8/2000 | Nishiyama | |
| 6,318,343 B1 * | 11/2001 | Nakagawa | F02D 41/3845 123/500 |
| 6,557,530 B1 | 5/2003 | Benson et al. | |
| 6,567,758 B1 | 5/2003 | Wuori | |

(Continued)

OTHER PUBLICATIONS

International Search Report and Written Opinion dated May 22, 2014 in corresponding International Application No. PCT/US14/15115.

(Continued)

*Primary Examiner* — Lindsay Low
*Assistant Examiner* — George Jin
(74) *Attorney, Agent, or Firm* — Faegre Baker Daniels LLP

(57) ABSTRACT

A system and method for is provided to determine a fuel flow cutout delay between transmitting a signal to stop a fuel flow to a fuel accumulator of a fuel system and the actual stop of fuel flow to the fuel accumulator. The fuel flow cutout delay is used to determine when pressure data from a sensor associated with the fuel accumulator is unaffected by fuel flow to the fuel accumulator.

14 Claims, 5 Drawing Sheets

(56) References Cited

U.S. PATENT DOCUMENTS

| | | | |
|---|---|---|---|
| 6,675,638 B2 | 1/2004 | Pfitz | |
| 6,694,953 B2 | 2/2004 | Barnes et al. | |
| 6,705,290 B2 | 3/2004 | Puckett | |
| 6,981,489 B2 | 1/2006 | Petrone et al. | |
| 7,027,907 B2 | 4/2006 | LeGall et al. | |
| 7,093,586 B2 | 8/2006 | Mattes | |
| 7,188,608 B2 | 3/2007 | Wilson et al. | |
| 7,210,459 B2 | 5/2007 | Shibata | |
| 7,249,596 B2 | 7/2007 | Pellizzari et al. | |
| 7,275,511 B1 | 10/2007 | Wright et al. | |
| 7,299,790 B2 * | 11/2007 | Okamoto et al. | 123/506 |
| 7,421,329 B2 | 9/2008 | Bowling et al. | |
| 7,558,665 B1 | 7/2009 | Geveci et al. | |
| 7,606,655 B2 | 10/2009 | Husted et al. | |
| 7,610,901 B2 | 11/2009 | Bucher et al. | |
| 7,628,146 B2 | 12/2009 | Kloppenburg et al. | |
| 7,650,778 B2 | 1/2010 | Puckett et al. | |
| 7,717,088 B2 | 5/2010 | Thomas | |
| 7,779,816 B2 | 8/2010 | Doelker | |
| 7,788,015 B2 | 8/2010 | Geveci et al. | |
| 7,789,068 B2 | 9/2010 | Serra et al. | |
| 7,827,963 B2 | 11/2010 | Li et al. | |
| 7,835,850 B2 | 11/2010 | Nakata et al. | |
| 7,841,319 B2 | 11/2010 | Thomas | |
| 7,980,120 B2 | 7/2011 | Cinpinski et al. | |
| 8,047,175 B2 | 11/2011 | Nishi et al. | |
| 8,100,112 B2 | 1/2012 | Nakata et al. | |
| 8,789,511 B2 * | 7/2014 | Sakata | F02D 41/3863 123/456 |
| 9,169,784 B2 | 10/2015 | Moonjelly et al. | |
| 2003/0051709 A1 * | 3/2003 | Yu | F02D 41/3845 123/458 |
| 2004/0055576 A1 | 3/2004 | McCarthy | |
| 2004/0134268 A1 | 7/2004 | Tuken et al. | |
| 2004/0149253 A1 * | 8/2004 | Kikuchi et al. | 123/295 |
| 2004/0194762 A1 * | 10/2004 | Okamoto | 123/458 |
| 2005/0061297 A1 * | 3/2005 | Oono | 123/458 |
| 2005/0126538 A1 * | 6/2005 | Warne et al. | 123/436 |
| 2006/0107927 A1 * | 5/2006 | Yamamoto | 123/447 |
| 2006/0107929 A1 | 5/2006 | Yamamoto | |
| 2007/0079808 A1 | 4/2007 | Takahashi | |
| 2007/0079809 A1 * | 4/2007 | Oono | 123/456 |
| 2008/0059039 A1 * | 3/2008 | Nakagawa et al. | 701/99 |
| 2008/0216797 A1 * | 9/2008 | Oono | 123/447 |
| 2008/0236547 A1 * | 10/2008 | Takahashi | F02D 41/2467 123/447 |
| 2009/0020630 A1 | 1/2009 | Yan | |
| 2009/0095244 A1 | 4/2009 | Leone et al. | |
| 2009/0164086 A1 | 6/2009 | Geveci et al. | |
| 2009/0177366 A1 | 7/2009 | Achleitner et al. | |
| 2009/0188472 A1 | 7/2009 | Ulrey et al. | |
| 2009/0241642 A1 | 10/2009 | Kyllingstad | |
| 2009/0255503 A1 | 10/2009 | Fujiwara | |
| 2010/0250102 A1 | 9/2010 | Imai et al. | |
| 2011/0030655 A1 | 2/2011 | Kaneko | |
| 2011/0041808 A1 | 2/2011 | Li | |
| 2011/0232610 A1 * | 9/2011 | Okamoto | 123/495 |
| 2011/0253106 A1 | 10/2011 | Bartsch et al. | |
| 2013/0000606 A1 | 1/2013 | Watanabe et al. | |
| 2013/0013174 A1 | 1/2013 | Nistler et al. | |
| 2013/0013175 A1 | 1/2013 | Nistler et al. | |
| 2014/0224218 A1 | 8/2014 | Carey et al. | |
| 2014/0224219 A1 | 8/2014 | Carey et al. | |
| 2014/0224223 A1 | 8/2014 | Benson et al. | |
| 2015/0020777 A1 | 1/2015 | Carey et al. | |

OTHER PUBLICATIONS

International Search Report dated May 30, 2014 in corresponding International Application No. PCT/US14/15196, 1 page.

International Search Report dated Oct. 22, 2014 in corresponding International Application No. PCT/US14/46967, 1 page.

* cited by examiner

SYSTEM AND METHOD FOR ADAPTING TO A VARIABLE FUEL DELIVERY CUTOUT DELAY IN A FUEL SYSTEM OF AN INTERNAL COMBUSTION ENGINE

TECHNICAL FIELD

This disclosure relates to a system and method for adjusting the start of data acquisition in a fuel system based on a variable fuel delivery cutout delay.

BACKGROUND

As with all mechanical devices, fuel injectors have physical dimensions that lead to variations between fuel injectors. In addition, each fuel injector has different rates of wear and responds to temperature changes differently. Since the fuel delivered by each fuel injector during a fuel injection event varies enough to affect the performance of an associated engine, it is useful to measure or calculate the fuel delivery by each fuel injector. One challenge with these measurements and calculations is optimizing the window for the collection of data.

SUMMARY

This disclosure provides a fuel system for an internal combustion engine, the system comprising a fuel accumulator, a sensor, a plurality of fuel injectors, and a control system. The fuel accumulator is positioned to receive a fuel flow. The sensor is adapted to detect a fuel pressure in the fuel accumulator and to transmit a pressure signal indicative of the fuel pressure in the fuel accumulator. Each fuel injector of the plurality of fuel injectors is operable to deliver a quantity of fuel from the fuel accumulator to one of a plurality of combustion chambers. The control system is adapted to generate a control signal to command a stop of the fuel flow to the accumulator, to determine an actual termination of fuel flow to the accumulator based on the pressure signal and to determine a delay from a transmission of the control signal to the termination of fuel flow.

This disclosure also provides a method of determining a command delay in a fuel system of an internal combustion engine. The method comprises providing a fuel flow to a fuel accumulator and transmitting a control signal to stop the fuel flow to the fuel accumulator to define a beginning of a termination event. The method further comprises detecting a fuel pressure in the fuel accumulator during the termination event and determining an actual termination of the fuel flow to the accumulator by analyzing the fuel pressure. The method further comprises calculating the command delay from the transmission of the control signal to the actual termination of the fuel flow. Advantages and features of the embodiments of this disclosure will become more apparent from the following detailed description of exemplary embodiments when viewed in conjunction with the accompanying drawings.

DETAILED DESCRIPTION

Figure 1:
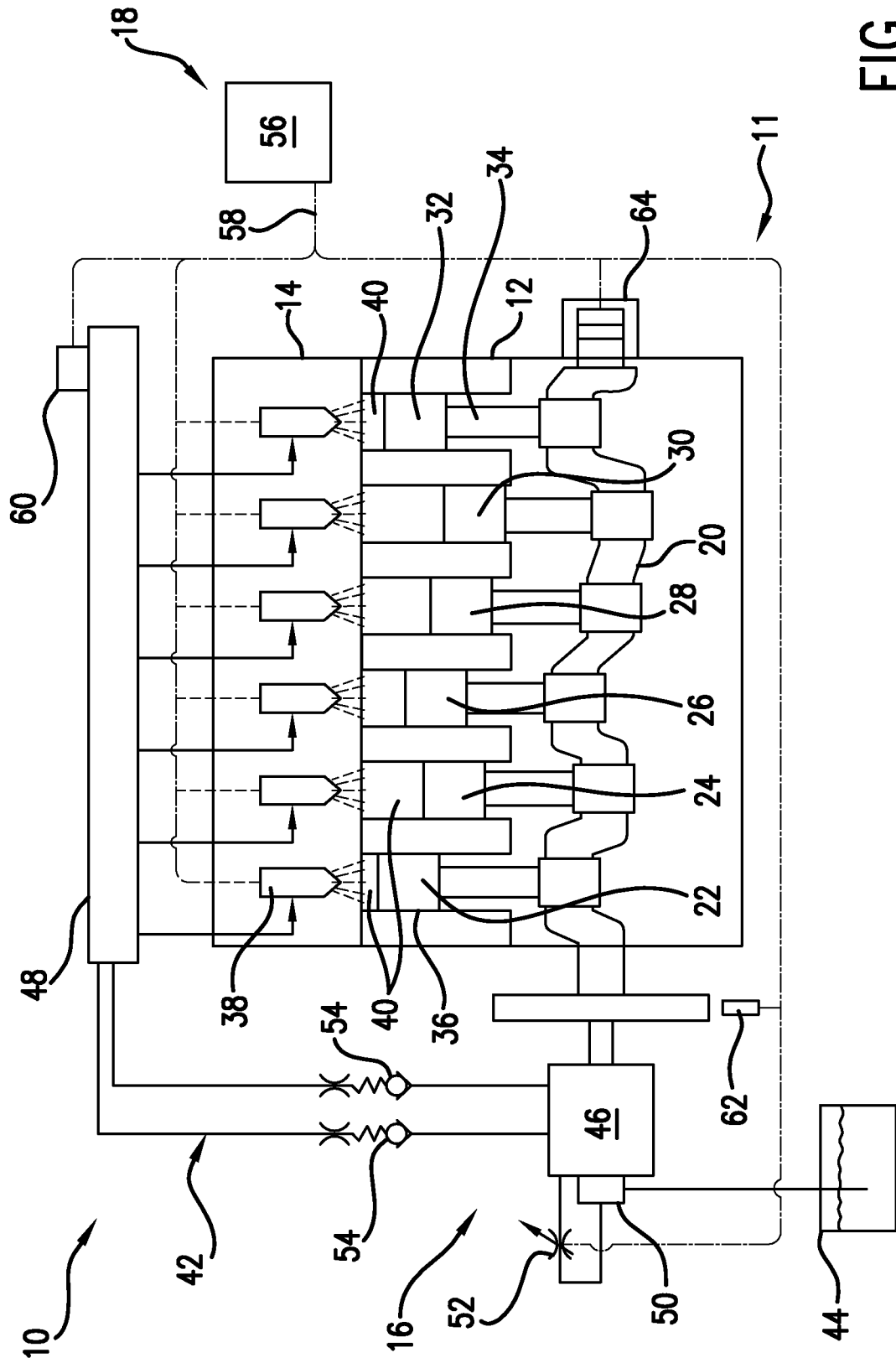
FIG. 1 is a schematic of an internal combustion engine incorporating an exemplary embodiment of the present disclosure.

Referring to FIG. 1, a portion of a conventional internal combustion engine is shown as a simplified schematic and generally indicated at 10. Engine 10 includes an engine body 11, which includes an engine block 12 and a cylinder head 14 attached to engine block 12, a fuel system 16, and a control system 18. Control system 18 receives signals from sensors located on engine 10 and transmits control signals to devices located on engine 10 to control the function of those devices, such as one or more fuel injectors.

One challenge with fuel injectors is that they have a measure of variability from injector to injector because of dimensional tolerances, assembly variations, and wear over time. These variations lead to variations in fuel quantity delivered, which cause undesirable variations in output power in engine 10 and causes undesirable variation in emissions, e.g., NOX and CO. In order to combat these undesirable effects, techniques of measuring fuel delivery by each fuel injector have been developed. However, these techniques have their own undesirable side effects. One technique that avoids the use of individual flow measurements is to measure the pressure decrease in a fuel accumulator while fuel flow to the fuel accumulator is stopped for a specific time. However, this technique can lead to an undesirable decrease in fuel pressure in the fuel accumulator. Another technique is to halt fuel flow to the accumulator until the fuel pressure in the accumulator decreases by a predetermined or specific amount. Regardless of which technique is used, a measure of intrusion in the fuel system is involved. In some situations, such as when fuel flow is stopped, or when huge quantities of data must be gathered to assure data is gathered for a target fuel injector, the level of intrusion into a fuel system may be extremely high. Furthermore, because these techniques gather all available data, rather than timing data collection to the target fuel injector, these techniques are inefficient. If fuel flow is stopped at the wrong time, valuable data that might be acquired will need to be discarded because there is insufficient time to determine whether the data meets predetermined requirements. Control system 18 is able to determine either the crank angle and/or time required for fuel system 16 to stop the flow of fuel to the accumulator of fuel system 16 after fuel system 16 receives a fuel flow cutout command to stop fuel flow. The time between transmission of the cutout command to stop fuel flow to the accumulator of fuel system 16 and time fuel flow actually stops flowing into the accumulator may be called a fuel flow cutout lead angle, delay, or time. The term "cutout" in this disclosure corresponds to shutoff, stoppage, or stopping of fuel flow to the fuel accumulator. By knowing the fuel flow cutout lead angle, delay, or time, the termination of fuel flow to the accumulator of fuel system 16 may be arranged to obtain the maximum number of useful data points from a fuel pressure sensor associated with the fuel accumulator. While the fuel flow to the fuel accumulator is stopped, which forms a termination event, control system 18 receives signals from the pressure sensor associated with the fuel accumulator indicative of the fuel pressure in the fuel accumulator.

Engine body 12 includes a crank shaft 20, a #1 piston 22, a #2 piston 24, a #3 piston 26, a #4 piston 28, a #5 piston 30, a #6 piston 32, and a plurality of connecting rods 34. Pistons 22, 24, 26, 28, 30, and 32 are positioned for reciprocal movement in a plurality of engine cylinders 36, with one piston positioned in each engine cylinder 36. One connecting rod 34 connects each piston to crank shaft 20. As will be seen, the movement of the pistons under the action of a combustion process in engine 10 causes connecting rods 34 to move crankshaft 20.

A plurality of fuel injectors 38 are positioned within cylinder head 14. Each fuel injector 38 is fluidly connected to a combustion chamber 40, each of which is formed by one piston, cylinder head 14, and the portion of engine cylinder 36 that extends between the piston and cylinder head 14.

Fuel system 16 provides fuel to injectors 38, which is then injected into combustion chambers 40 by the action of fuel injectors 38, forming one or more injection events. Fuel system 16 includes a fuel circuit 42, a fuel tank 44, which contains a fuel, a high-pressure fuel pump 46 positioned along fuel circuit 42 downstream from fuel tank 44, and a fuel accumulator or rail 48 positioned along fuel circuit 42 downstream from high-pressure fuel pump 46. While fuel accumulator or rail 48 is shown as a single unit or element in the exemplary embodiment, accumulator 48 may be distributed over a plurality of elements that contain high-pressure fuel. These elements may include fuel injector(s) 38, high-pressure fuel pump 46, and any lines, passages, tubes, hoses and the like that connect high-pressure fuel to the plurality of elements, and a separate fuel accumulator 48 may thus be unnecessary. Fuel system 16 also includes an inlet metering valve 52 positioned along fuel circuit 42 upstream from high-pressure fuel pump 46 and one or more outlet check valves 54 positioned along fuel circuit 42 downstream from high-pressure fuel pump 46 to permit one-way fuel flow from high-pressure fuel pump 46 to fuel accumulator 48. Inlet metering valve 52 has the ability to vary or shut off fuel flow to high-pressure fuel pump 46, which thus shuts off or stops fuel flow to fuel accumulator 48. Though not shown, additional elements may be positioned along fuel circuit 42. For example, inlet check valves may be positioned downstream from inlet metering valve 52 and upstream from high-pressure fuel pump 46, or inlet check valves may be incorporated in high-pressure fuel pump 46. Fuel circuit 42 connects fuel accumulator 48 to fuel injectors 38, which receive fuel from fuel circuit 42 and then provide controlled amounts of fuel to combustion chambers 40. Fuel system 16 may also include a low-pressure fuel pump 50 positioned along fuel circuit 42 between fuel tank 44 and high-pressure fuel pump 46. Low-pressure fuel pump 50 increases the fuel pressure to a first pressure level prior to fuel flowing into high-pressure fuel pump 46, which increases the efficiency of operation of high-pressure fuel pump 46.

Control system 18 may include a control module 56 and a wire harness 58. Many aspects of the disclosure are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions (software), such as program modules, being executed by one or more processors, or by a combination of both. Moreover, the disclosure can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. It should be noted that the system of the present disclosure is illustrated and discussed herein as having various modules and units that perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

Control system 18 also includes an accumulator pressure sensor 60 and a crank angle sensor. While sensor 60 is described as being a pressure sensor, sensor 60 may be other devices that may be calibrated to provide a pressure signal that represents fuel pressure, such as a force transducer, strain gauge, or other device. The crank angle sensor may be a toothed wheel sensor 62, a rotary Hall sensor 64, or other type of device capable of measuring the rotational angle of crankshaft 20. Control system 18 uses signals received from accumulator pressure sensor 60 and the crank angle sensor to determine the combustion chamber receiving fuel, which is then used to analyze the signals received from accumulator pressure sensor 60, described in more detail hereinbelow.

Control module 56 may be an electronic control unit or electronic control module (ECM) that may monitor conditions of engine 10 or an associated vehicle in which engine 10 may be located. Control module 56 may be a single processor, a distributed processor, an electronic equivalent of a processor, or any combination of the aforementioned elements, as well as software, electronic storage, fixed lookup tables and the like. Control module 56 may include a digital or analog circuit. Control module 56 may connect to certain components of engine 10 by wire harness 58, though such connection may be by other means, including a wireless system. For example, control module 56 may connect to and provide control signals to inlet metering valve 52 and to fuel injectors 38.

When engine 10 is operating, combustion in combustion chambers 40 causes the movement of pistons 22, 24, 26, 28, 30, and 32. The movement of pistons 22, 24, 26, 28, 30, and 32 causes movement of connecting rods 34, which are drivingly connected to crankshaft 20, and movement of connecting rods 34 causes rotary movement of crankshaft 20. The angle of rotation of crankshaft 20 is measured by engine 10 to aid in timing of combustion events in engine 10 and for other purposes. The angle of rotation of crankshaft 20 may be measured in a plurality of locations, including a main crank pulley (not shown), an engine flywheel (not shown), an engine camshaft (not shown), or on the camshaft itself. Measurement of crankshaft 20 rotation angle may be made with toothed wheel sensor 62, rotary Hall sensor 64, and by other techniques. A signal representing the angle of rotation of crankshaft 20, also called the crank angle, is transmitted from toothed wheel sensor 62, rotary Hall sensor 64, or other device to control system 18.

Crankshaft 20 drives high-pressure fuel pump 46 and low-pressure fuel pump 50. The action of low-pressure fuel pump 50 pulls fuel from fuel tank 44 and moves the fuel along fuel circuit 42 toward inlet metering valve 52. From inlet metering valve 52, fuel flows downstream along fuel circuit 42 through inlet check valves (not shown) to high-pressure fuel pump 46. High-pressure fuel pump 46 moves the fuel downstream along fuel circuit 42 through outlet check valves 54 toward fuel accumulator or rail 48. Inlet metering valve 52 receives control signals from control system 18 and is operable to block fuel flow to high-pressure fuel pump 46. Inlet metering valve 52 may be a proportional valve or may be an on-off valve that is capable of being rapidly modulated between an open and a closed position to adjust the amount of fluid flowing through the valve.

Fuel pressure sensor 60 is connected with fuel accumulator 48 and is capable of detecting or measuring the fuel pressure in fuel accumulator 48. Fuel pressure sensor 60 sends signals indicative of the fuel pressure in fuel accumulator 48 to control system 18. Fuel accumulator 48 is connected to each fuel injector 38. Control system 18 provides control signals to fuel injectors 38 that determines operating parameters for each fuel injector 38, such as the length of time fuel injectors 38 operate and the number of fueling pulses per a firing or injection event period, which determines the amount of fuel delivered by each fuel injector 38.

Figure 2:
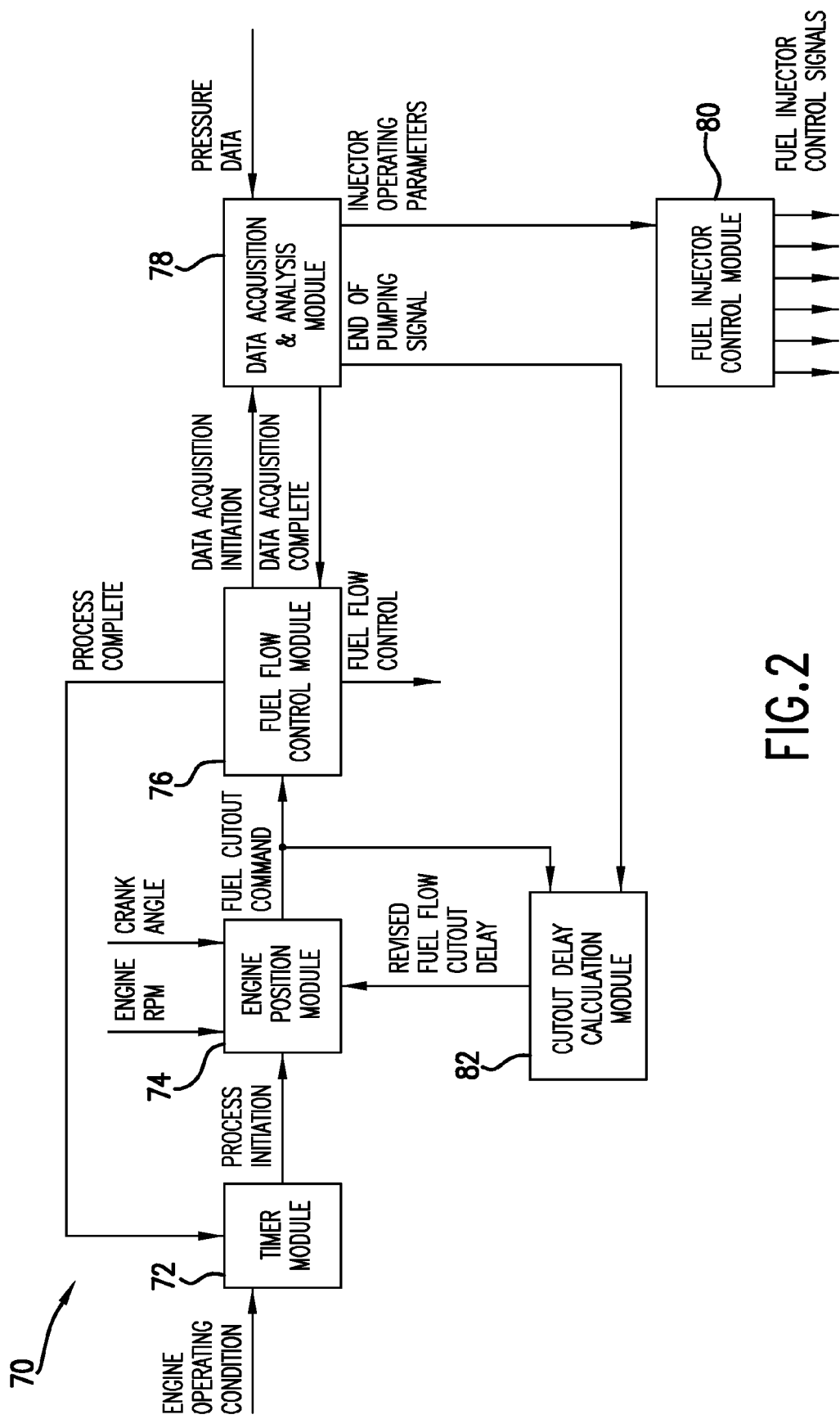
FIG. 2 is a data acquisition, analysis and control (DAC) module of the engine of FIG. 1 in accordance with an exemplary embodiment of the present disclosure.

Control system 18 includes a process that controls certain components of engine 10 to enable measurement of fuel delivery by each individual fuel injector 38, and receives information from certain components of engine 10 to be able to determine a fuel flow cutout command lead angle or delay to optimize the acquisition of data from fuel pressure sensor 60. Turning now to FIG. 2, a data acquisition, analysis and control (DAC) module 70 in accordance with an exemplary embodiment of the present disclosure is shown. DAC module 70 includes a timer module 72, an engine position module 74, a fuel flow control module 76, a data acquisition and analysis module 78, a fuel injector control module 80, and a cutout delay calculation module 82.

Timer module 72 receives a signal indicative of an operating condition of engine 10 and a process complete signal from fuel flow control module 76. The function of timer module 72 is to initiate the data acquisition process of DAC module 70 when the operating condition of engine 10 permits and at a specific or predetermined interval. Timer module 72 also monitors the engine operating condition and may adjust the timing interval to include measurements under a variety of engine conditions, such as a variety of fueling quantities and accumulator pressure levels. Timer module 72 may also inhibit a new measurement if accumulator 48 remains at a constant pressure level or if fuel injectors 38 are commanded at the same fueling level, though such inhibitions may have a maximum length of time. Timer module 72 may also monitor the convergence of each fuel injector 38. A fuel injector 38 is converged when new measurements from the process described hereinbelow match the adapted or adjusted fueling characteristics, which means that the measurement interval may be increased to avoid unnecessary fuel flow stoppages. If convergence never occurs, the processes described below may indicate a system malfunction requiring operator intervention. Timer module may also limit the number of times fuel flow is stopped to avoid excessive fuel flow stoppages. In order to initiate the data acquisition process, timer module 72 initiates or starts a timing process using either the operating condition of engine 10 or the completion of a previous data acquisition process. When engine 10 initially starts, timer module 72 receives the engine operating condition signal from control system 18 that indicates engine 10 is operating, which initiates a timer in timer module 72. When the timer reaches a specified or predetermined interval, which may be in the range of one to four hours and may be described as a drive cycle or an OBD (on-board diagnostics) cycle, timer module 72 generates and transmits a process initiation signal to engine position module 74. Subsequent timing processes are initiated from the process complete signal received from flow control module 76.

The engine operating condition signal may be a signal from control system 18 indicating the engine 10 is operating, meaning that high-pressure fuel pump 46 and fuel injectors 38 are operating. The engine operating condition signal may indicate that engine 10 is not operating properly. For example, engine 10 may have a fuel system malfunction that would cause fuel pressure sensor 60 to have erroneous readings. In another example, engine 10 may need to be within a certain performance range to for DAC module 70 to operate correctly. In yet another example, engine 10 may be in a shutdown mode or may already have ceased operation. In any of these examples, pressure data from fuel pressure sensor 60 may be misleading, and DAC module 70 would either not operate or would stop operating on receipt of an engine operating signal indicative of engine 10 operation that would cause erroneous pressure signals from fuel pressure sensor 60.

Engine position module 74 receives the process initiation signal from timer module 72, engine RPM data and crank angle data from internal combustion engine 10, and a fuel cutout delay signal from cutout delay calculation module 82. Engine position module 74 generates and transmits a fuel cutout command to fuel flow control module 76 and to cutout delay calculation module 82. Though not specifically shown in FIG. 2, engine position module 74 provides crank angle data to at least data acquisition and analysis module 78 and cutout delay calculation module 82 for use in analyzing the pressure signals and performing other calculations. After engine position module 74 receives the process initiation signal from timer module 72, engine position module 74 uses the engine RPM and crank angle data in combination with an estimated or calculated fuel cutout delay to determine the optimal crank angle or time for initiation of the fuel cutout command. When the optimal crank angle is detected, engine position module 74 transmits the fuel cutout command to flow control module 76 and to cutout delay calculation module 82.

Fuel flow control module 76 receives the fuel cutout command from engine position module 74, and a data acquisition complete signal from data acquisition and analysis module 78. Flow control module 76 generates and transmits a data acquisition initiation signal to data acquisition and analysis module 78, the process complete signal to timer module 72 and a fuel flow control signal to fuel system 16. After flow control module 76 receives the fuel cutout command, flow control module 76 transmits the fuel flow control signal to fuel system 16 to stop fuel flow to fuel accumulator 48. The transmission of the fuel flow control signal occurs at a first crank angle. Flow control module 76 then transmits the data acquisition initiation signal to data acquisition and analysis module 78. After flow control module 76 receives the data acquisition complete signal from data acquisition and analysis module 78, flow control module 76 sends the fuel flow control signal to fuel system 16 to re-start fuel flow to fuel accumulator 48. Once fuel flow has been re-started, fuel flow control module 76 sends the process complete signal to timer module 72, which will cause the timing process to begin again to set another interval for data acquisition.

Data acquisition and analysis module 78 receives the data acquisition initiation signal from flow control module 76 and a fuel pressure data signal from fuel rail or accumulator pressure sensor 60. Module 78 generates and provides one or more injector operating parameter signals to fuel injector control module 80, the data acquisition complete signal to flow control module 76, and an end of pumping signal to cutout delay calculation module 82. When data acquisition and analysis module 78 receives the data acquisition initiation signal from flow control module 76, data acquisition and analysis module 78 begins to store fuel pressure data signals from accumulator pressure sensor 60. Module 78 will analyze the fuel pressure data signals to determine when fuel accumulator 48 has stopped receiving fuel flow from fuel system 16. When data acquisition and analysis module 78 determines that fuel is no longer flowing into fuel accumulator 48 from fuel system 16, module 78 sends an end of pumping or end of fuel flow signal to cutout delay calculation module 82. Data acquisition and analysis module 78 may also transmit crank angle data with the end of pumping or end of fuel flow signal. Data acquisition and analysis module 78 also analyzes the fuel pressure data signals to determine when a predetermined decrease in the fuel pressure, which may also be described as a predetermined pressure differential, has been reached. Once the predetermined fuel pressure decrease has been reached, module 78 will complete the analysis of the fuel pressure data signals to determine whether the operating parameters for one or more fuel injectors 38 needs to be modified. If one or more operating parameters for any fuel injector 38 require adjustment, module 78 will transmit the modified fuel injector operating parameters to fuel injector control module 80 for use in subsequent fuel injection events. Once the predetermined fuel pressure decrease has been reached, data acquisition and analysis module 78 also generates and transmits the data acquisition complete signal to flow control module 76.

Fuel injector control module 80 receives fuel injector operating parameters from data acquisition and analysis module 78 and provides signals to each fuel injector 38 that control the operation of each fuel injector 38. For example, the operating parameters may include the duration of the injection event, which may be described as an injection event on-time or the time of operation for each fuel injector 38, the number of fueling pulses from a fuel injector 38, and placement of a fuel injection event with respect to the crank angle or crankshaft angle. Though not shown, fuel injection control module 78 also receives information regarding a desired fuel quantity, desired start-of-injection timing, and other information that may be needed to control the operation of each fuel injector 38 properly.

Cutout delay calculation module 82 receives the fuel cutout command and crank angle data from engine position module 74 and the end of pumping signal from data acquisition and analysis module 78 along with crank angle data from engine position module 74. Cutout delay calculation module 82 uses these signals and data to determine the fuel flow cutout command delay that occurs between the transmission of a signal to fuel system 16 to stop fuel flow, which occurs at the first crank angle, and the actual cessation of fuel flow into fuel accumulator 48, which occurs at a second crank angle. Cutout delay calculation module 82 generates and transmits the fuel flow command cutout delay signal, which may be revised from the previously used fuel flow cutout command delay, to engine position module 74.

Figure 3:
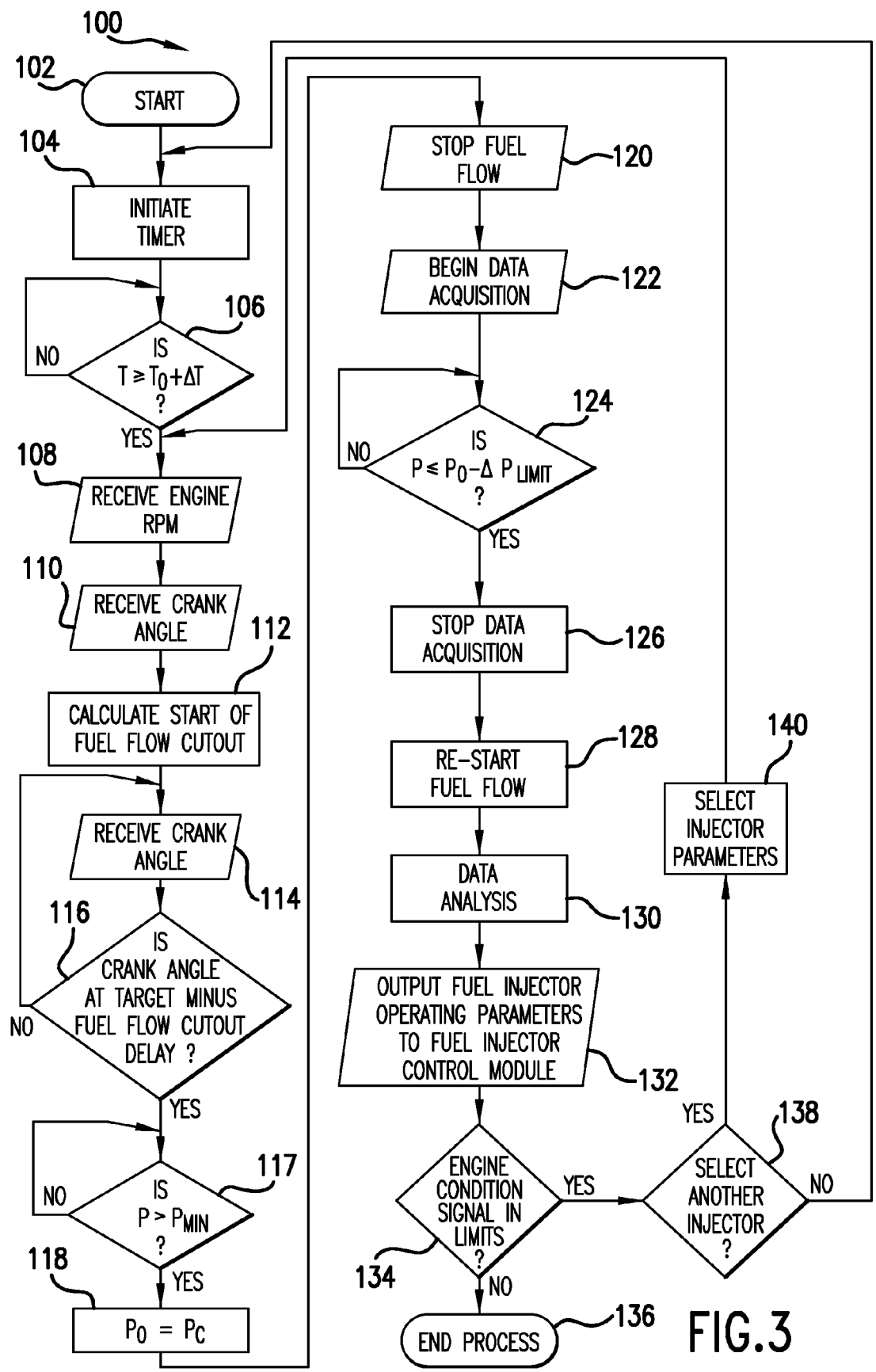
FIG. 3 is a process flow diagram for a data acquisition process of the DAC module of FIG. 2 in accordance with an exemplary embodiment of the present disclosure.

Turning now to FIG. 3, a flow diagram describing a data acquisition process 100 of control system 18 in accordance with an exemplary embodiment of the present disclosure is shown. Data acquisition process 100 may be distributed in one or more modules of control system 18, such as timer module 72, engine position module 74, flow control module 76, data acquisition and analysis module 78, and cutout delay calculation module 82. Data acquisition process 100 is likely to be part of a larger process incorporated in control module 56 that controls some or all of the functions of engine 10. Thus, while FIG. 3 shows data acquisition process 100 as a self-contained process, it is likely that data acquisition process 100 is "called" by a larger process, and at the completion of data acquisition process 100 control is handed back to the calling process.

Data acquisition process 100 initiates with a process 102. Process 102 may include setting variables within data acquisition process 100 to an initial value, clearing registers, and other functions necessary for the proper functioning of data acquisition process 100. From process 102, control passes to a process 104. At a process 104, a timer is initiated and a time $T_0$ is set. Data acquisition process 100 may use another timing function of engine 10 to establish an initial time $T_0$ for the requirements of data acquisition process 100. For convenience of explanation, the timing function is described as part of data acquisition process 100.

Data acquisition process 100 continues with a decision process 106. At process 106, data acquisition process 100 determines whether the current time T is great than or equal to $T_0$ plus a predetermined or specific change in time $\Delta T$ since the timer initiated. In an exemplary embodiment of the disclosure, $\Delta T$ may be one hour. The period may be greater or less than one hour, depending on measured changes in fuel delivered to each combustion chamber or on other conditions. While $\Delta T$ is described in this disclosure as a fixed or predetermined value, $\Delta T$ may be varied based on actual data. For example, if no adjustments to fuel injector 38 parameters are required for a lengthy period, such as one hour or more, $\Delta T$ may be incremented to a higher value, such as 30 minutes, by the action of one of the modules described herein. If T is less than $T_0$ plus $\Delta T$, data acquisition process 100 waits at decision process 106 until the present time is greater than or equal to $T_0$ plus $\Delta T$. As with initial time $T_0$, this timing function may be performed elsewhere in engine 10 and is included in this process for convenience of explanation. Once the condition of decision process 106 has been met, process 100 moves to a process 108.

At process 108, data acquisition process 100 receives engine RPM from internal combustion engine 10. RPM data may be acquired from the crank angle sensor previously described, or from other sensors (not shown) positioned on engine 10. These sensors may be connected directly or indirectly to control system 18. From process 108, data acquisition process 100 move to a process 110, where data acquisition process 100 receives crank angle data from engine 10.

Data acquisition process 100 next moves to a process 112, where the engine RPM received during process 108 and the crank angle information received during process 110 are used in conjunction with a fuel flow cutout command lead angle or fuel flow cutout command delay time to determine an optimal time to initiate the fuel flow cutout command. One challenge with stopping fuel flow to fuel accumulator 48 is that it takes a finite amount of time for a fuel flow cutout command to be transmitted from control system 18 to fuel system 16, and for fuel system 16 to respond to the command. Even after fuel system 16 stops fuel flow, if fuel flow is stopped by preventing fuel flow from reaching high-pressure pump 46, there may yet remain fuel in high-pressure pump 46, which will pump the residual fuel to accumulator 48. Thus, the function of process 112 is to determine, based on the fuel flow cutout command delay measured from pressure data, engine RPM, and crank angle, the optimal crank angle to send the fuel flow cutout command to fuel system 16 to maximize acquisition of valid data during fuel injection events. The timing of the fuel flow cutout command is important because fuel flow needs maintained and the window for data collection is relatively narrow. If the fuel flow cutout command is transmitted at a non-optimal crank angle, it is possible that no pressure data will be collected during a fuel flow cutout event or a termination event.

From process 112, data acquisition process 100 moves to a process 114, where the current crank angle position is received by data acquisition process 100. At a decision process 116, data acquisition process 100 determines when the crank angle that is optimum for stopping fuel flow to fuel accumulator 48 has been reached. If the optimum crank angle has yet to be reached, control will return to process 114. Decision process 116 and process 114 will be repeated until the optimum crank angle has been achieved. When the optimum crank angle has been reached, control passes to a process 117, where data acquisition process 100 determines whether the pressure P in fuel accumulator 48 is greater than $P_{Min}$, which is a typical or normal operating pressure for fuel accumulator 48. The intent of process 117 is to assure that fuel accumulator 48 is at the normal operating pressure. If the pressure P does not meet the condition of process 117, data acquisition process 100 waits until the condition of process 117 is met. Data acquisition process 100 then moves to a process 118, where data acquisition process 100 sets fuel pressure $P_0$ to the current fuel pressure $P_C$ in fuel accumulator 48.

Data acquisition process 100 then moves to a process 120. In the exemplary embodiment, at process 120 control system 18 generates and transmits a control signal to inlet metering valve 52 to close, stopping fuel flow to high-pressure fuel pump 46, forming the start of a termination event. In other embodiments, fuel flow may be stopped in other ways. For example, the fuel pump may be connected to the engine by a clutch or may be electrically drive, and the control signal may disengage the clutch or stop operation of the fuel pump. In yet another embodiment, a valve arrangement may bypass fuel from the fuel pump back to the fuel tank. In yet another embodiment, a valve may connect an inlet of the fuel pump to a pumping chamber of the fuel pump, preventing pressurization of the pumping chamber to a level that would introduce high-pressure fuel to fuel accumulator 48 Control system 18 begins storing fuel pressure signals from accumulator pressure sensor 60 at a process 122. At a process 124, control system 18 will monitor the fuel pressure signals to determine when fuel has ceased flowing to fuel accumulator 48. Once process 124 has determined that fuel flow to fuel accumulator 48 has ceased, data acquisition process 100 calculates the crank angle and/or the time interval that passed from when the control signal was sent to stop fuel flow until fuel flow actually ceased. This calculation is the actual fuel flow cutout delay, which may be averaged with previously calculated fuel flow cutout delays to refine the accuracy of the fuel flow cutout delay.

Data acquisition will proceed from the first piston selected by data acquisition process 100 through the firing sequence. Data acquisition may begin considering piston firing order, or to acquire data for a piston for which data is lacking. For example, data acquisition may begin with piston #1 and proceed through the firing sequence, which may be piston 22, piston 30, piston 26, piston 32, piston 24, and piston 28, or piston #1, piston #5, piston #3, piston #6, piston #2, and piston #4. However, data acquisition may begin with any piston.

At a decision process 126, data acquisition process 100 determines whether the fuel pressure in fuel accumulator 48 is less than or equal to $P_0$ minus $\Delta P_{Limit}$, where $\Delta P_{Limit}$ is the maximum total fuel pressure decrease or pressure differential permissible in fuel accumulator 48. The quantity $\Delta P_{Limit}$ is a predetermined value that maintains a typical or normal operating pressure in fuel accumulator 48 during the shutdown of fuel flow to fuel accumulator 48. Once the condition of decision process 126 has been met, data acquisition process 100 moves to a process 128, where data acquisition from accumulator pressure sensor 60 is stopped. Though not shown in data acquisition process 100, process 100 may include an additional process during the data acquisition process that aborts the cutout event if the accumulator pressure drops below a preset level, regardless of any other condition. Data acquisition process 100 may also include a process that provides for multiple fuel cutout events, with each cutout event separated by an adjustable or calibratable interval, e.g., 15 seconds.

At a process 130, control system 18 generates and transmits a signal to inlet metering valve 52 to open, restore, enable, re-enable, start, or re-start fuel flow to high-pressure fuel pump 46 and fuel accumulator 48, ending the termination event. The fuel pressure signals or data acquired during the data acquisition process are analyzed by control system 18 at a process 132 to determine the amount of fuel delivered by each fuel injection event that took place during the data acquisition process, described in more detail hereinbelow.

The data analysis determines whether one or more operating parameters of one or more fuel injectors require adjustment. If one or more operating parameters of one or more fuel injectors require adjustment, then the parameters are generated and transmitted to fuel injector control module 80 at a process 134.

At a decision process 136, data acquisition process 100 determines whether the engine condition signal indicates engine 10 is operating acceptably and is continuing to operate, as described hereinabove. If the engine condition signal indicates engine 10 is operating in a manner that would lead to erroneous pressure data from fuel pressure sensor 60, or that engine 10 is shutting down or has shut down, then measurement of fuel delivery by fuel injectors 38 is no longer desirable and may lead to invalid data. In these situations, data acquisition process 100 ends at a process 138. If engine 10 is continuing to operate, and to operate in a manner that would yield accurate fuel pressure data from fuel pressure sensor 60, data acquisition process 100 moves to a decision process 140, where data acquisition process 100 determines whether data for another fuel injector 38 needs to be acquired. If data for another fuel injector 38 needs acquired, data acquisition process 100 moves to a process 142.

At process 142, parameters for data acquisition centered on another fuel injector are set. For example, if data needs collected for piston #6, which is piston 32, a fuel cutout delay for piston #6 is set, after which data acquisition process 100 returns to process 108 where additional data is collected. Data acquisition process 100 will continue to return to process 108 until at least one set of data is collected for each fuel injector 38, after which data acquisition process 100 returns to process 104, where the timer is restarted and data acquisition process 100 continues as previously described.

While data acquisition process 100 is described in the context of six pistons, data acquisition process 100 may be used for any number of pistons. The only adjustment required for the process to function properly is to provide the crank angles for firing of the pistons, and the firing order.

Figure 4:
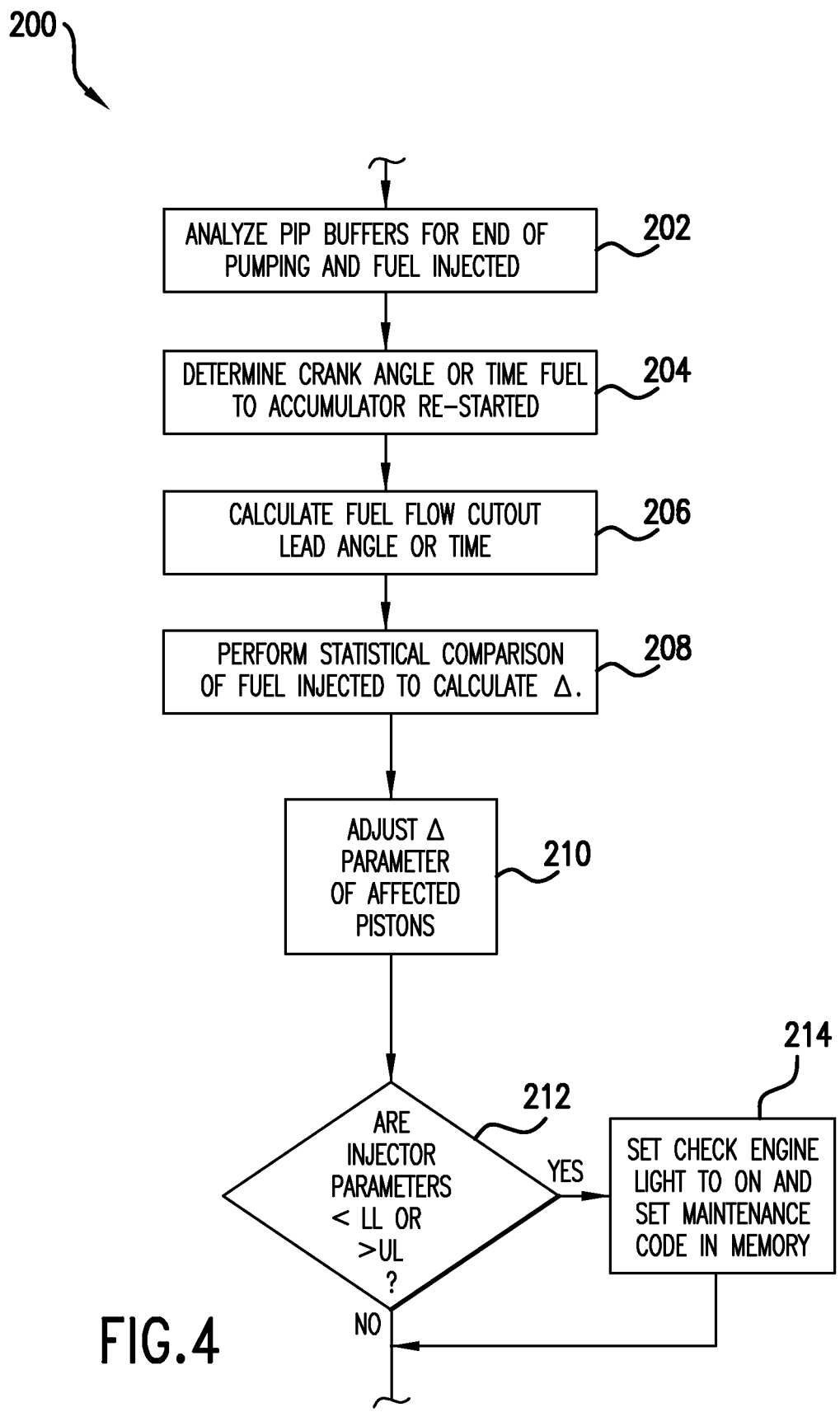
FIG. 4 is a process flow diagram for a data analysis process of FIG. 3 in accordance with an exemplary embodiment of the present disclosure.

A data analysis process 200 shown in FIG. 4 is a representative data analysis process performed in process 132 of data acquisition process 100. In a process 202, data analysis process 200 determines the crank angle or time of the last fuel flow to fuel accumulator 48. In a process 204, the crank angle or time fuel flow to accumulator 48 re-started is determined. At a process 206, using the first crank angle or the time at which the fuel flow cutoff command was sent to fuel system 16 and the second crank angle or the time of last fuel flow to accumulator 48, the fuel flow cutoff command delay, lead angle or time is determined and associated with a particular piston.

At a process 208, all data acquired is grouped by piston. Note that while the focus is on piston numbers for data collection, organization and analysis, organization could also be by fuel injectors, combustion chambers, etc., as long as the firing order is clearly defined and associated with crank angle. The fuel pressure decrease data is used to calculate the quantity of fuel delivered by a fuel injector in a known manner. In any set of fuel pressure decrease data acquired, there may be no data for a particular piston, and there may be multiple sets of data from a particular piston, which will be explained in more detail hereinbelow. Data analysis process 200 may perform additional processes with fuel pressure decrease data, such as averaging all available data for a piston over a plurality of predetermined intervals, such as data collected over the last hour, or a longer period. Such averaging might be performed to reduce noise that occurs in such data. The current and/or recently collected data for each piston is compared with historical data for that piston to determine any difference with current and/or recently collected data.

From process 208, data analysis process 200 moves to a process 210, where control parameters for each fuel injector 38 associated with the one or more pistons for which data was collected and analyzed are adjusted for future injection events. Such control parameters may include an injector on-time, number of firing pulses, and/or placement of a fuel injection event with respect to the crank angle.

From process 210, data analysis process 200 moves to a decision process 212. At decision process 212, data analysis process 200 compares the parameters of each fuel injector, which may include a fueling characteristic, with predetermined upper limits (UL) and lower limits (LL), which thus forms a range of operation for each fuel injector 38. The fueling characteristic may be defined as a quantity of fuel delivered versus an actuation duration. The fueling characteristic may take the form of one or more equations and/or an adaptive look-up table. If any parameter of any fuel injector 38 falls outside the predetermined limits or range, which may include a trim limit, data analysis process 200 moves to a process 214. At process 214, data analysis process 200 may set an operator indicator, such as a "CHECK ENGINE," "SERVICE ENGINE SOON," or other indicator visible to an operator of engine 10. Data analysis process 200 may also set a maintenance code in a memory of control system 18, indicating that a particular fuel injector's operating parameters have exceeded a predetermined range. After process 214 or after decision process 212, the data analysis process performed in process 132 of data acquisition process 100 is complete, and the associated processes continue as previously described.

Figure 5:
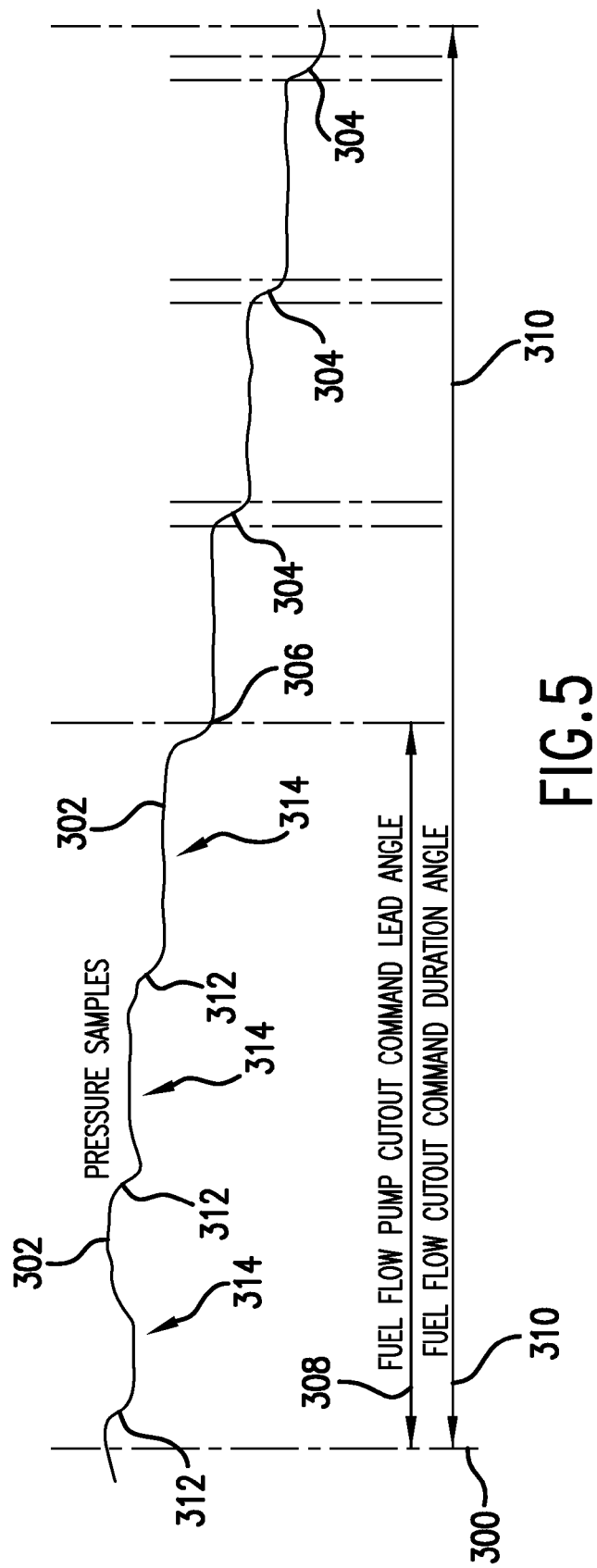
FIG. 5 is a graph showing data acquired from a fuel pressure sensor associated with a fuel accumulator of the internal combustion engine during a fuel flow cutout command to a fuel system of the internal combustion engine of FIG. 1.

FIG. 5 shows representative data acquired during the operation of the previously described processes. The horizontal axis of FIG. 5 shows the crank angle of engine 10, which spans the duration of one fuel flow termination event or the duration of a fuel flow cutout command, shown at a location 310. The vertical axis shows relative fuel pressures of fuel accumulator 48. The fuel flow cutout command is initiated at location 300. As described hereinabove, fuel may continue to flow to accumulator 48 after the fuel flow cutout command has been transmitted, which leads to irregular or non-uniform fuel pressure signals, shown at a location 302. These pressure signals appear as shown because one or more fuel injectors 38 continue to inject fuel into respective combustion chambers 40 while fuel from fuel system 16 continues to be pumped into accumulator 48.

Process 202 analyzes the fuel pressure signals across location 302, using one or more techniques to determine whether fuel pumping has ceased. For example, process 202 may find one or more pressure decreases 312, and determines whether the pressure at one or more locations 314 between locations 312 remains constant or includes increases, which would occur from fuel flow to accumulator 48. Process 202 may also find the locations of pressure decreases 312 and determine from a running average the behavior of the fuel pressure between pressure decreases 312, determining whether the pressure signals between pressure decreases 312 are consistent with a steady-state condition, indicative of no fuel flow into accumulator 48. There may be other analytical techniques for analyzing fuel flow into accumulator 48 to determine when all fuel flow into accumulator 48 has ceased. Once process 202 has determined the crank angle at which fuel flow into accumulator 48 has ceased by the analysis of fuel accumulator 48 pressure throughout the fuel flow cutout command, process 202 then calculates the crank angle from location 300 to location 306, which defines a fuel flow cutout command delay angle or time 308. As previously noted, fuel flow cutout command delay angle or time 308 is used to determine to initiate the fuel flow cutout command so that as much data as possible is acquired after the last fuel flow to fuel accumulator 48, which occurs at location 306.

After high-pressure pump 46 pumps any residual fuel into accumulator 48, fuel flow to accumulator 48 ceases, which occurs at location 306. After fuel flow to accumulator 48 ceases, pressure decreases due to injection events may be seen at locations 304. Because fuel flow to accumulator 48 has ceased, these pressure decreases are accurate representations of fuel injected by one or more fuel injectors 38 and the modules and processes described hereinabove use these pressure decreases to calculate the amount of fuel injected by fuel injectors associated with each pressure decrease. In addition, the modules and processes described hereinabove are able to use location 300, which is established by control system 18, and location 306, calculated from fuel pressure data, to determine the fuel flow cutout command delay or lead angle shown at location 308.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. A fuel system for an internal combustion engine, the system comprising:
a fuel accumulator positioned to receive a fuel flow;
a sensor adapted to detect a fuel pressure in the fuel accumulator and to transmit a pressure signal indicative of the fuel pressure in the fuel accumulator;
a plurality of fuel injectors, each fuel injector operable to deliver a quantity of fuel from the fuel accumulator to one of a plurality of combustion chambers; and
a control system adapted to generate a control signal to command a stop of the fuel flow to the accumulator, to determine an actual termination of fuel flow to the accumulator based on the pressure signal, to determine a command delay from a transmission of the control signal to the termination of fuel flow using at least one of RPM data of the engine and crank angle data of the engine, and to adjust an operating parameter of at least one of the plurality of fuel injectors based on the analysis of the pressure signal.

2. The system of claim 1, wherein the control signal to command the stop of the fuel flow occurs at a first crank angle, and the termination of fuel flow to the accumulator occurs at a second crank angle, and the delay is calculated from the first crank angle to the second crank angle.

3. The system of claim 1, further including an inlet metering valve, the inlet metering valve adapted to receive the control signal from the control system to stop the fuel flow to the accumulator.

4. The system of claim 1, wherein the fuel flow is stopped at a predetermined interval.

5. The system of claim 1, wherein a command to restart fuel flow is transmitted when the fuel pressure in the fuel accumulator has decreased by a predetermined amount.

6. A method of determining a command delay in a fuel system of an internal combustion engine, the method comprising:
providing a fuel flow to a fuel accumulator;
transmitting a control signal to stop the fuel flow to the fuel accumulator to define a beginning of a termination event;
detecting a fuel pressure in the fuel accumulator during the termination event;
detecting a revolutions-per-minute ("RPM") value for the internal combustion engine;
detecting a position of a crankshaft of the internal combustion engine;
determining an actual termination of the fuel flow to the accumulator by analyzing the fuel pressure;
calculating the command delay from the transmission of the control signal to the actual termination of the fuel flow using at least one of the RPM value of the internal combustion engine and the position of the crankshaft of the internal combustion engine to stop the fuel flow to the fuel accumulator; and
adjusting an operating parameter of at least one fuel injector based on the analysis of the pressure signal.

7. The method of claim 6, wherein the fuel flow to the fuel accumulator is re-started when the fuel pressure in the fuel accumulator decreases by a predetermined amount, defining an end of the termination event.

8. The method of claim 6, wherein the fuel flow is stopped at a predetermined interval.

9. The method of claim 6, wherein the signal to stop the fuel flow occurs at a first crank angle, and the actual termination of fuel flow to the accumulator occurs at a second crank angle, and the delay is calculated from the first crank angle to the second crank angle.

10. The method of claim 6, the internal combustion engine including a fuel injector operable to deliver an amount of fuel, and wherein the amount of fuel delivered by the fuel injector is determined from the pressure signal after the command delay.

11. The method of claim 10, the internal combustion engine including a control system, wherein the control system adjusts an operating parameter of the fuel injector to modify an amount of fuel delivered by the fuel injector during a subsequent fuel injection event.

12. The method of claim 6, wherein the internal combustion engine includes a control system and an inlet metering valve positioned to control the fuel flow to the fuel accumulator and the fuel flow is stopped by sending a control signal from the control system to the inlet metering valve.

13. The fuel system of claim 1, wherein the control system is further adapted to determine, based on the delay, an optimal crank angle at which the control signal to command the stop of the fuel flow to the accumulator is initiated.

14. The method of claim 6, further comprising determining, based on the command delay, an optimal crank angle at which the control signal to command the stop of the fuel flow to the accumulator is initiated.

* * * * *